(12) United States Patent
Waller et al.

(10) Patent No.: US 10,763,595 B1
(45) Date of Patent: Sep. 1, 2020

(54) ELECTRICAL BRIDGING DEVICE FOR BRIDGING ELECTRICAL COMPONENTS, IN PARTICULAR AN ENERGY SOURCE OR AN ENERGY CONSUMER

(71) Applicant: FRAUNHOFER-GESELLSCHAFT ZUR FOERDERUNG DER ANGEWANDTEN FORSCHUNG E.V., Munich (DE)

(72) Inventors: Reinhold Waller, Neunkirchen (DE); Vincent Lorentz, Erlangen (DE); Martin Maerz, Nuremberg (DE)

(73) Assignee: FRAUNHOFER-GESELLSCHAFT ZUR FOERDERUNG DER ANGEWANDTEN FORSCHUNG E.V., Munich (DE)

( * ) Notice: Subject to any disclaimer, the term of this patent is extended or adjusted under 35 U.S.C. 154(b) by 344 days.

(21) Appl. No.: 15/776,210

(22) PCT Filed: Nov. 17, 2016

(86) PCT No.: PCT/EP2016/077930
§ 371 (c)(1),
(2) Date: May 15, 2018

(87) PCT Pub. No.: WO2017/085157
PCT Pub. Date: Mar. 26, 2017

(30) Foreign Application Priority Data

Nov. 20, 2015 (DE) .................. 10 2015 222 939

(51) Int. Cl.
*H01R 4/02* (2006.01)
*H01M 2/20* (2006.01)
*H01M 2/34* (2006.01)
*H01G 9/004* (2006.01)

(52) U.S. Cl.
CPC ............ *H01R 4/025* (2013.01); *H01M 2/206* (2013.01); *H01M 2/348* (2013.01); *H01G 9/004* (2013.01); *H01M 2200/103* (2013.01)

(58) Field of Classification Search
CPC ...... H01R 4/025; H01M 2/348; H01M 2/206; H01M 2200/103; H01G 9/004
(Continued)

(56) References Cited

U.S. PATENT DOCUMENTS 4,849,806 A   7/1989  Kahlen et al. .................. 357/51
5,256,899 A * 10/1993  Rangappan .......... H01H 85/046
                                                257/529
(Continued)

FOREIGN PATENT DOCUMENTS

CA  1291790   11/1991  ............... H02J 7/00
DE  1 613 968  6/1971
(Continued)

OTHER PUBLICATIONS

English language translation of International Search Report dated Feb. 16 in related Application No. PCT/EP2016/077930.
(Continued)

*Primary Examiner* — Sherman Ng
(74) *Attorney, Agent, or Firm* — Renner Kenner Greive Bobak Taylor & Weber

(57) ABSTRACT

The present invention relates to an electrical bridging device comprising two electrical conductors which are electrically isolated from each other and arranged such that two surface regions of both conductors are separated from each other by a gap. The two surface regions are each covered with a layer composed of an electrically conductive material which has a lower melting point than the electrodes. A reactive layer in which an exothermic reaction can be triggered is arranged above the two layers. The gap between the two surface
(Continued)

regions is selected and the reactive layer is dimensioned and arranged such that the two layers which are composed of the electrically conductive material fuse at the gap due to the thermal energy which is emitted during the exothermic reaction of the reactive layer and consequently an electrical connection is created between the electrical conductors.

21 Claims, 2 Drawing Sheets

(58) Field of Classification Search
 USPC .......................................................... 174/84 R
 See application file for complete search history.

(56) References Cited

U.S. PATENT DOCUMENTS

| | | | |
|---|---|---|---|
| 2003/0164106 A1* | 9/2003 | Mueller-Fiedler | F42B 3/124 102/205 |
| 2004/0134371 A1* | 7/2004 | Bernhard | F42B 3/124 102/202.7 |
| 2006/0267721 A1* | 11/2006 | Graf | H05K 1/0201 337/297 |
| 2007/0018774 A1* | 1/2007 | Dietsch | H01H 85/055 337/159 |
| 2013/0252039 A1* | 9/2013 | Vom Dorp | H01M 10/4207 429/61 |
| 2014/0020845 A1* | 1/2014 | Scatena | B32B 25/20 156/701 |

FOREIGN PATENT DOCUMENTS

| | | | | |
|---|---|---|---|---|
| EP | | 2 851 972 A1 | 3/2015 | ............. H01M 2/06 |
| WO | WO 01/83182 A1 | | 11/2001 | |

OTHER PUBLICATIONS

English language translation of Written Opinion dated Feb. 16 in related application No. PCT/EP2016/077930.

* cited by examiner

ELECTRICAL BRIDGING DEVICE FOR BRIDGING ELECTRICAL COMPONENTS, IN PARTICULAR AN ENERGY SOURCE OR AN ENERGY CONSUMER

CROSS-REFERENCE TO RELATED APPLICATION

This is a § 371 application of International patent application number PCT/EP2016/077930 filed Nov. 17, 2016, which claims the benefit of German patent application number 10 2015 222 939.4, filed Nov. 20, 2015, and which are incorporated herein by reference.

TECHNICAL FIELD

The present invention relates to an electrical bridging device comprising at least two electrical conductors which are electrically isolated from each other and which can be brought into electrical connection with each other by the triggering of an exothermic reaction in a reactive layer arranged on the conductors.

An electrical bridging device of such kind is used in particular for bridging an energy source or an energy consumers. Such energy sources or energy consumers are used in a wide range of devices, for example in electric motor vehicles or stationary energy accumulators. The electrical energy can be stored in chemical form, such as in the case of battery cells, or also in physical form, such as in the case of capacitor cells, for example. In order to generate sufficient voltages and high currents of 100 to 1000 A such as are necessary for motor vehicles with electric drives, for example, several of these cell, for example between 4 and over 100 cells are connected in series to form a cell stack. One challenge with cells that are connected in series or in parallel is the reliability of the stack as a whole and the reconfiguration of the stack in the event of a cell failure. In the absence of other precautions, if one cell fails in a cell stack, the entire system malfunctions even though the stack itself still comprises a sufficient number of intact cells. Consequently, when a system of such kind is used in an electric vehicle, a fault in a cell can cause a system malfunction. Moreover, a degraded battery cell may also manifest increased internal resistance, which in turn leads to impermissible heating of the cell. Therefore, it is desirable as a matter of principle to be able to bridge defective cells electrically while the energy accumulator is operating, in order to avoid problems of such kind.

A similar problem also exists in the case of consumers that are connected in series, in lighting systems including a plurality of lighting elements connected in series for example. If one of the consumers fails, this can lead to the failure of the entire system.

RELATED ART

In order to solve the aforementioned problems, components called "antifuses" are known and are used to bridge the cell or the consumer in question electrically in the event of a failure. These antifuses are used most often in low power systems, such as integrated circuits or lighting systems. For example, fuses are known that have a thin barrier of a non-conductive, amorphous silicon between two metal contacts. If a sufficiently high voltage is applied to the amorphous silicon via the two connectors, the silicon is converted into a conductive, polycrystalline silicon-metal alloy with low resistance. In lighting systems such an antifuse serves to prevent the entire serial circuit from failing if a single light malfunctions. In such a case, the lights are equipped with this fuse. If the light fails, the full mains voltage remains available via the single failed light. Thus, the fuse becomes effective and the failed light is electrically bridged so that the serial circuit can continue to perform its function.

In the field of photovoltaics, for example, it is also known to bridge energy sources and/or energy consumers using bypass diodes. The bypass diodes are used to manage short-term interruptions in energy generation by a cell, if a solar generator cell is overshadowed for example. However, bypass diodes only establish a connection in one direction, so an energy accumulator with bypass diodes would only function reliably in the case of energy output. However, it would not be possible to recharge the remaining intact cells, since the diode would block in the opposite direction. For this reason, bypass diodes such as are known from the field of photovoltaics do not represent a practicable approach to bridging for the applications described in the introduction.

A bridging device for safeguarding battery cells which enables irreversible bridging of destroyed storage cells that have failed at high resistance is known from DE 37 21 754 A1. The bridging device consists of two semiconductor components arranged in layers and connected in series, each having different current/voltage characteristics. In the event of the failure of a destroyed storage cell at high resistance, the high charge current flows through both semiconductor components, which are fused due to the sharp increase in temperature resulting therefrom, thereby irreversible short circuiting the storage cell at low resistance. However, a passive bridging device of such kind is only triggered if the accumulator cell is already significantly degraded. Premature triggering, to prevent high dissipation losses for example, is not possible.

The antifuses described previously are not suitable for use in the applications described in the introduction, for batteries for supplying the power for an electric drive, for example. This is mainly due to the high resistance of such fuses in the triggered state, which results in dissipation losses in the order of up to 50 W and thus causes impermissible heating of the fuses, the low current carrying capacity of such fuses, and also their high cost.

An electrical bridging element for bridging defective storage cells in energy storage systems which is also suitable in principle for batteries of high electrical output is described in DE 10 2012 005 979 A1. In this bridging element, a layer sequence with at least one electrical isolation layer and one or more reactive layer stacks in which an exothermic reaction can be triggered is formed between two electrical conductors. The reactive layer stacks and the isolation layer are matched with each other in such a way that the isolation layer is dissolved by the thermal energy emitted in the exothermic reaction, and an electrical connection is established between the electrical conductors. However, residues from the isolation material can present problems with this bridging element.

The object of the present invention is to describe an electrical bridging device for bridging electrical components which in the triggered state is able to carry high currents with low serial resistance at the same time, allows permanent, irreversible bridging of the monitored components, and can be realised in a cost-effective manner.

SUMMARY OF THE INVENTION

The object is solved with the electrical bridging device according to Patent Claim 1. Advantageous variants of the bridging device are the subject matter of the dependent patent claims or may be gleaned from the following description and the exemplary embodiment.

The suggested electrical bridging device has at least two electrical conductors which are electrically isolated from one another, and which during use are connected for example to the two poles of an energy source or an energy consumer that is to be bridged. The two electrical conductors are arranged in such a way that at least one first surface region of the first conductor orientated in a spatial direction is separated by a gap from at least one second surface region of the second conductor orientated in the same spatial direction.

The term orientation of a surface region in a spatial direction is understood to mean that the surface area is identifiable as a surface region from this spatial direction. This is intended above all to indicate that the two surface regions are not directed towards each other nor are they arranged at right angles to each other. The first and second surface regions are each covered with a layer consisting of an electrically conductive material which has a lower melting point then the material of the electrical conductors. In this context, this layer is preferably a metallic solder material. In principle, however, other materials such as electrically conductive polymer materials are also possible.

In the suggested bridging device, the gap width and the electrically conductive layers are selected in such manner that the gap is bridged by the fusion of the two layers. A layer consisting of a reactive material, also called the reactive layer in the present patent application, in which layer an exothermic reaction can be triggered is arranged above the two layers of electrically conductive material. In this context, the term layer is also understood to mean a contiguous sequence of layers consisting of different layer materials or a layer stack. The reactive layer is dimensioned and arranged in such manner that the two layers of the electrically conductive material fuse at the gap owing to the thermal energy emitted during the exothermic reaction of the reactive layer and as a result an electrical connection is established between the electrical conductors.

Consequently, in order to create the electrical bridge it is only necessary to trigger the exothermic reaction in the reactive layer appropriately. Depending on the nature of the reactive material, this may be effected for example by current flow, heating, a sparking effect, laser irradiation or an initial igniter. One example of a reactive layer is a reactive nanofilm, for example a reactive Ni/Al film such as is known for example from WO 01/83182 A1. Nanofilms of such kind comprise a large number of nanolayers with layer thicknesses in the range from 1 nm to 500 nm, wherein layers of two different materials which react with each other exothermically in response to appropriate energy input are typically arranged in alternating sequence. Other reactive layers may also be used in the suggested bridging device, for example layers of nanothermite or other exothermically reacting materials. In this context, the reactive layer must be arranged over both surface regions in such manner that in the untriggered state it does not establish an electrical contact between the two surface regions. In the case of an electrically conductive reactive layer, it must therefore be at a distance from at least one of the surface regions, or it must be electrically isolated from one or both surface regions by a suitable spacer element.

In a preferred variant, the reactive layer lies on one of the two surface regions, while the other surface region is offset in height correspondingly to maintain an electrically isolating distance from the reactive layer. If a nanofilm is used as the reactive layer, no further measures are necessary for this, since it is already rigid enough and thus self-supporting. Of course, the reactive layer may also be affixed to a carrier element, by which the distance from at least one of the surface regions covered with the electrically conductive layer is maintained. The height difference between the two surface regions may be created either by different heights or thicknesses of the two electrical conductors or also by different thicknesses of the two layers consisting of the electrically conductive material.

Both the electrical isolation between the two electrical conductors and the isolation of at least one of the surface regions from the reactive layer if said layer is electrically conductive, are selected depending on the respective application. In this context, the isolation between the two electrical conductors may be assured with an air gap or by the use of an isolation material between the two electrical conductors.

With the suggested bridging device, an energy source such as a battery cell or an electrical consumer as a component to be bridged may be bridged electrically low resistive by triggering the exothermic reaction. In the triggered state, a resistance of <20 $\mu\Omega$ with an active surface area (area under the reactive layer) of about 1 cm$^2$ is achievable. In the untriggered state, the bridging device may have a resistance of >40 M$\Omega$. The suggested bridging device thus also enables the flow of high currents, such as can occur in the applications described in the introduction, and may also be realised in cost effective manner due to its simple construction.

The low electrical resistance in the triggered state may be adjusted by providing the boundary line as long as possible between the two surface regions, which is bridged by the electrically conductive layer material in the triggered state. This is achieved particularly advantageously by structuring the electrical conductors suitably in this area, so that the two conductors engage in each other. In this way, for example, a serpentine, zigzag or also tooth-like boundary line may be created in limited space with a finger-form engagement. A configuration is possible in which the two electrical conductors engage not in a direction parallel to the two surface regions but perpendicularly to these surface regions. To this end, the two conductors overlap, wherein the lower conductor (second electrical conductor) has one or more elevations and the upper conductor (first electrical conductor) has one or more corresponding openings in which the elevations may engage. The openings extend continuously as far as the first surface region of the upper conductor, wherein the one or more second surface regions are then formed by the plateaus on the elevations of the lower conductor. Such a configuration also has the advantage of high mechanical stability. Moreover, in a variant of this configuration, in which the one or more second surface regions is/are positioned lower than the first surface region, the first surface region may be in full contact with the reactive layer, which in turn also protects the gap between the first and the one or more second surface region(s) from being penetrated by unwanted material.

In an advantageous further development of the suggested bridging device, the reactive layer is pressed against the uppermost of the two surface regions using a pressure element. The pressure element may consist of an electrically conductive material, for example a metal such as copper or aluminium, or also of an electrically isolating material, for example a plastic. In this context, the reactive layer may be loose or it may also be affixed to the underside of said pressure element. A resilient element, preferably a spring element may serve as a biasing element and be positioned between the pressure element and a carrier structure, particularly a housing of the bridging device. The housing or carrier structure is permanently connected to both electrical conductors.

In a further advantageous variant, a further layer of the electrically conductive material, particularly a solder material, is formed between the pressure element and the reactive layer, and is also melted as a result of the triggered exothermic reaction, contributing to the electrical connection between the two electrical conductors. The pressure element in this case preferably also consists of an electrically conductive material, for example a metal. The pressure element preferably covers the reactive layer completely so that it may press the reactive layer evenly against the first surface region. An electrically conductive pressure element serves to lower the electrical resistance further when connecting the two electrical conductors.

The exothermic reaction may be triggered for example thermally by means of a current flow through the reactive layer. In this way, the reactive layer may be contacted for example via one or more contact pins to deliver an electrical voltage. Alternatively, a constriction may also be created in the reactive layer by appropriate structuring, at which constriction a corresponding generation of heat is achieved due to the increased resistance when a current flows. The reactive layer may also be activated or triggered optically, for example by a pulse of light or a laser pulse. In a further variant, an initial igniter may be used, in the form of a reactive wire, for example, which is arranged in contact with or at least close to the reactive layer. Such a reactive wire is also made from a reactive material, for example a layer sequence of Al and Pd, and may be triggered thermally by a current flow for example. Reactive wires of such kind are also available commercially, with the name Pyrofuze® for example. The reactive layer may also be triggered by electrical sparking. Of course, this does not represent an exhaustive list.

In the suggested bridging device, the two electrical conductors may be soldered for example to a DCB (Direct Copper Bond) substrate. Such a substrate lends high mechanical stability to the bridging device.

With the suggested bridging device, an irreversibly activatable electrical connection with low resistance is provided. It may serve to bridge a defective component in a current path, thereby ensuring that the system as a whole can continue functioning. Examples are the bridging of defective components, particularly energy accumulators or electrical consumers. A further example is the deactivation of energy accumulators, e.g., lithium ion battery cells, by triggering the shutdown separator, with short-duration short-circuit currents in the 10 kA range.

BRIEF DESCRIPTION OF THE DRAWINGS

In the following section, the suggested bridging device will be explained again in greater detail with reference to two exemplary embodiments. In the drawing.

WAYS TO REALISE THE INVENTION

Figure 1:
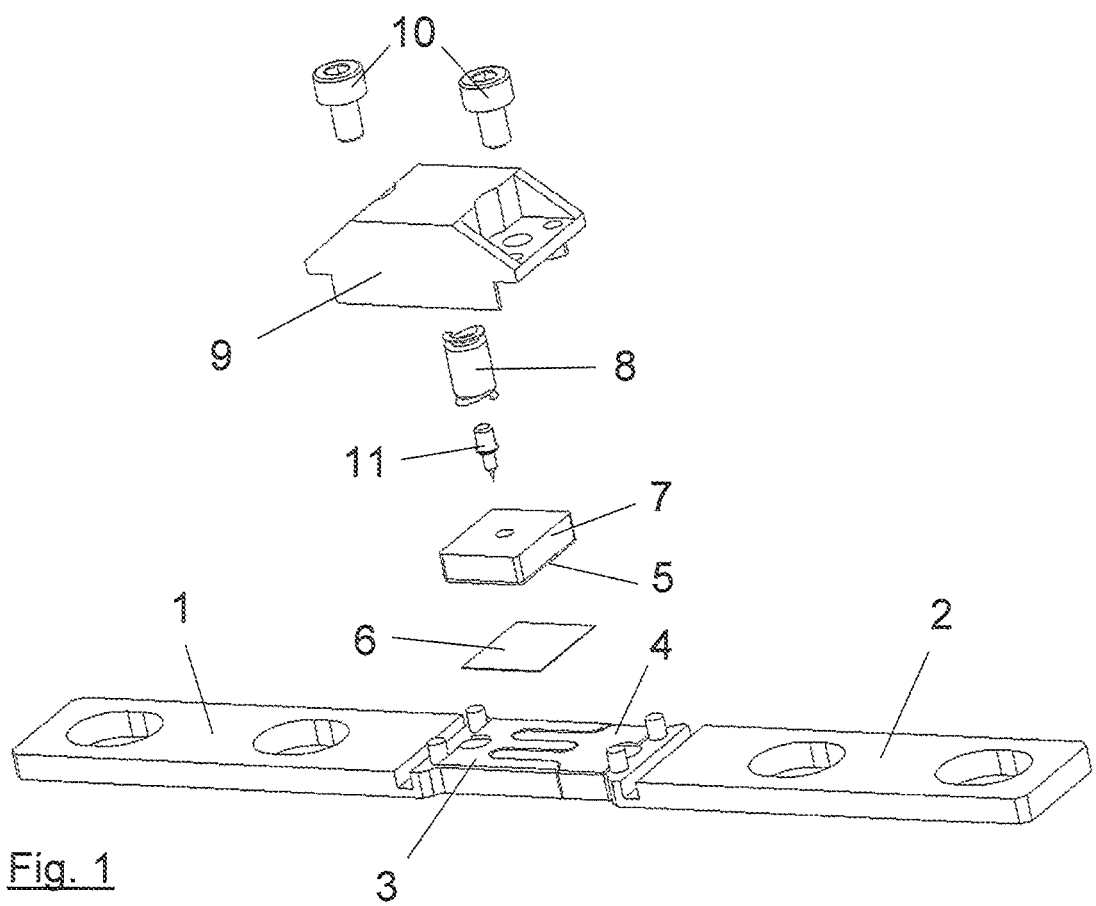
FIG. 1 shows a partially exploded view of a first example of a bridging device according to the present invention.

FIG. 1 shows a first example of a variant of the suggested bridging device. The bridging device consists of two electrodes 1, 2 which are isolated from each other. The electrodes are structured in such manner that the boundary line is formed as long as possible on their upper sides between the adjacent surface regions thereof. In the case shown, this is realised by an engaging finger structure of the two electrodes 1, 2. Electrical isolation material—not shown in the figure—is located between the two electrodes and functions as a spacer. Adjacent surface regions on each of the two electrodes 1, 2 are furnished with a solder layer 3, 4. Solder layer 4 of second electrode 2 is thinner in construction than solder layer 3 of first electrode 1. This creates a height difference, so that the reactive layer 6 applied to solder layer 3 of first electrode 1 in the present example does not touch the solder layer 4 of second electrode 2. In this way, the isolation between the two electrodes 1, 2 is maintained by the air gap between reactive layer 6, in the form of a reactive nanofilm for example, and second solder layer 4. Reactive layer 6 is pressed against first solder layer 3 of first electrode 1 by a pressure element 7, which in the present example is coated on the underside with a further solder layer 5. The necessary pressure is supplied by a spring element 8, which is arranged in housing 9 of the bridging device between pressure element 7 and housing 9. In the present example, housing 9 is screwed onto the two electrodes 1, 2 with screws 10 and is made of an electrically isolating material.

When the bridging device is activated, the solder layers 3, 4, 5 are melted by the heat emitted from the exothermically reacting reactive layer 6 and fused together thereby. This then establishes the electrical connection between the two electrodes 1, 2. In the present example, the exothermic reaction of reactive layer 6 is triggered by means of a current flow in reactive layer 6. To achieve this, the reactive layer is contacted electrically via a contact pin 11 which extends through an opening in pressure element 7 as far as reactive layer 6. Since reactive layer 6 is in contact with first solder layer 3 and thus also with first electrode 1, an electrical voltage may be applied to reactive layer 6 via contact pin 11 and first electrode 1 to generate the current flow through reactive layer 6 which is required to trigger the exothermic reaction.

Figure 2:
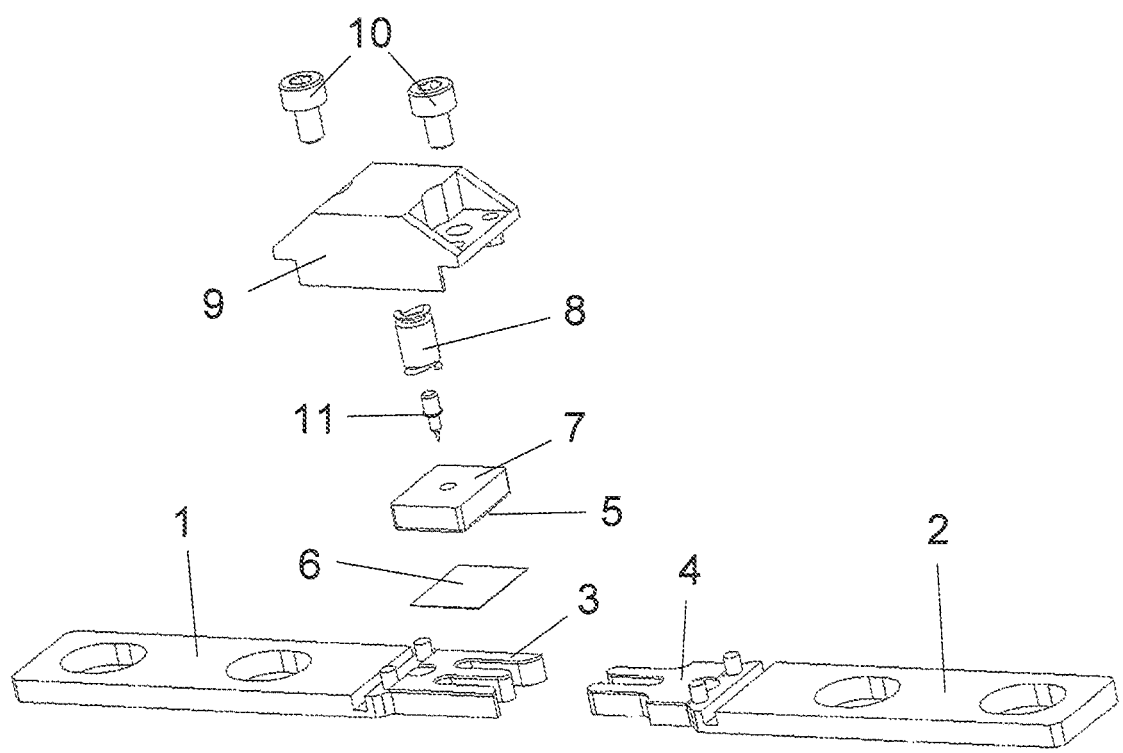
FIG. 2 shows a fully exploded view of the example of FIG. 1.

FIG. 2 is another view of this exemplary bridging device, in fully exploded display, in which the two electrodes 1, 2 are also shown separate.

Figure 3:
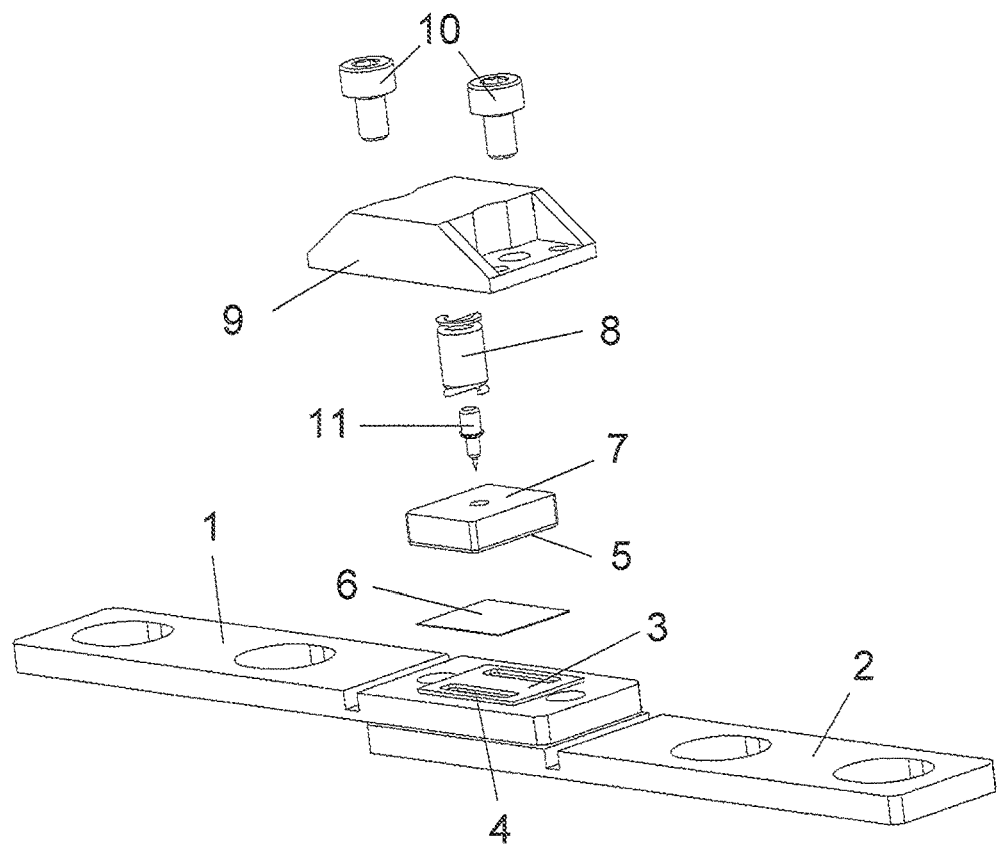
FIG. 3 shows a partially exploded view of a second example of a bridging device according to the present invention.
Figure 4:
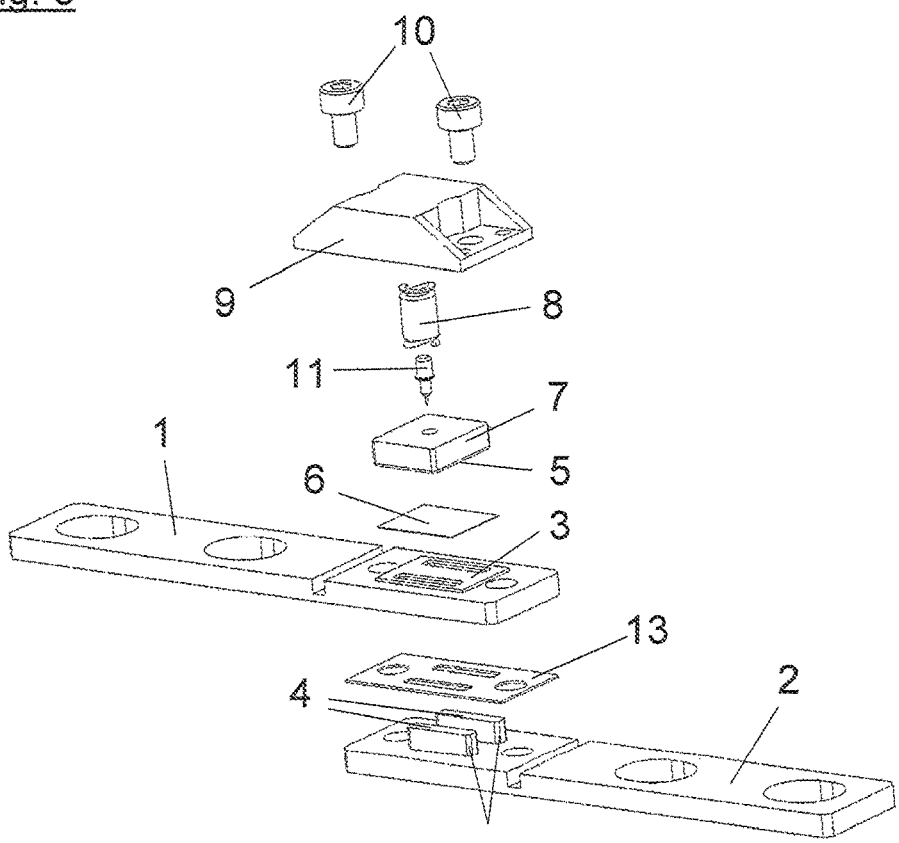
FIG. 4 shows a fully exploded view of the example of FIG. 3.

FIG. 3 shows a further example of the suggested bridging device. In this example, the same reference signs are used to denote the same elements of the bridging device as in FIGS. 1 and 2. This variant differs in the construction of the two electrodes 1, 2 and the adjacent surface regions of these electrodes. The two electrodes 1, 2 in this example are constructed so that they partially cover each other. In the overlap region, the lower of the two electrodes comprises two web elements 12 which engage in continuous openings in the uppermost of the two electrodes. In the assembled state, the upper plateaus of these two web elements 12 are lower than the surface of the top electrode, as may be seen in FIG. 3. These adjacent surface regions correspondingly support the two solder layers 3 and 4 and are covered by reactive layer 6. Since the plateaus of web elements 12 are lower than the surface of the upper electrode, an electrically isolating gap with respect to reactive layer 6 is created here as well. In this example too, reactive layer 6 is pressed against upper solder layer 3 via pressure element 7. This takes place in the same manner and with the same components as is illustrated in FIGS. 1 and 2. The two electrodes 1, 2 are isolated on one side by an electrically isolating layer 13 which is shown in the fully exploded representation in FIG. 4. Inside the openings, isolation between web elements 12 of the lower electrode 2 and the wall regions of the openings in upper electrode 1 is assured with a corresponding air gap or also an isolating material. The two screws 10 for fastening housing 9 must be electrically isolated or made from an electrically isolating material in this example.

The reactive layer 6 and is activated and the electrical connection between the two electrodes 1, 2 resulting therefrom is created in the same way as was described previously with reference to FIG. 1.

LIST OF REFERENCE SIGNS

1 First electrode
2 Second electrode
3 First solder layer
4 Second solder layer
5 Solder layer on underside of the pressure element
6 Reactive layer
7 Pressure element
8 Spring element
9 Housing
10 Connecting screws
11 Contact pin
12 Web elements
13 Isolation layer

The invention claimed is:

1. Electrical bridging device, comprising:
at least one first and one second electrical conductor which are electrically isolated from each other and arranged such that at least one first surface region of the first conductor orientated in a spatial direction is separated by a gap from at least one second surface region of the second conductor orientated in the same spatial direction,
the first and second surface regions are each covered with a layer consisting of an electrically conductive material, which has a lower melting point than the electrical conductors, and
a reactive layer in which an exothermic reaction can be triggered is arranged above the two layers of electrically conductive material,
wherein the gap between the two surface regions is selected and the reactive layer is dimensioned and arranged in such manner that the two layers composed of the electrically conductive material fuse at the gap due to the thermal energy emitted during the exothermic reaction of reactive layer, and as a result an electrical connection is established between the electrical conductors.

2. Bridging device according to claim 1, characterized in that the first surface region is arranged with a height offset relative to the second surface region.

3. Bridging device according to claim 1, characterized in that the two layers composed of the electrically conductive material are of different thicknesses.

4. Bridging device according to claim 2, characterized in that the reactive layer lies on one of the layers composed of the electrically conductive material, which is formed on the uppermost of the two surface regions and is located at a distance from the other layer.

5. Bridging device according to claim 3, characterized in that the reactive layer lies on the thicker of the two layers composed of the electrically conductive material and is located at a distance from the other layer.

6. Bridging device according to claim 4, characterized in that a pressure element is arranged above the reactive layer, via which the reactive layer is pressed against the respective layer composed of the electrically conductive material by means of a resilient element, particularly a spring element.

7. Bridging device according to claim 6, characterized in that a further layer of the electrically conductive material is arranged between the pressure element and the reactive layer.

8. Bridging device according to claim 7, characterized in that the pressure element consists of an electrically conductive material.

9. Bridging device according to claim 6, characterized in that a cover is arranged above the reactive layer with the pressure element and is connected permanently with the first and second electrical conductors, wherein the resilient element is tensioned between the cover and the pressure element.

10. Bridging device according to claim 6, characterized in that the pressure element covers the reactive layer completely.

11. Bridging device according to claim 1, characterized in that the electrically conductive material is a solder.

12. Bridging device according to claim 1, characterized in that the first and second electrical conductors engage with each other in the area of the first and second surface regions.

13. Bridging device according to claim 12, characterized in that the first and second electrical conductors engage with each other with a finger-like structure in a direction parallel to the first and second surface regions in the area of the first and second surface regions.

14. Bridging device according to claim 12, characterized in that the first and second electrical conductors engage with each other in a direction perpendicular to the first and second surface regions in the area of the first and second surface regions.

15. Bridging device according to claim 14, characterized in that the first electrical conductor has a least one continuous opening in the first surface region, in which opening a raised area of the second electrical conductor engages from a side of the first electrical conductor opposite the first surface region, wherein the raised area has a plateau which corresponds to the second surface region.

16. Bridging device according to any claim 1, characterized in that besides the first and second electrical conductors one or more further electrical conductors are arranged and covered with a layer composed of an electrically conductive material in the same manner, so that an electrical connection with the one or more further electrical conductors is also established by the thermal energy emitted during the exothermic reaction of the reactive layer.

17. Bridging device according to claim 5, characterized in that a pressure element is arranged above the reactive layer, via which the reactive layer is pressed against the respective layer composed of the electrically conductive material by means of a resilient element, particularly a spring element.

18. Bridging device according to claim 17, characterized in that a further layer of the electrically conductive material is arranged between the pressure element and the reactive layer.

19. Bridging device according to claim 18, characterized in that the pressure element consists of an electrically conductive material.

20. Bridging device according to claim 17, characterized in that a cover is arranged above the reactive layer with the pressure element and is connected permanently with the first and second electrical conductors, wherein the resilient element is tensioned between the cover and the pressure element.

21. Bridging device according to claim 17, characterized in that the pressure element covers the reactive layer completely.

\* \* \* \* \*